US012799969B2

(12) United States Patent
Beyer

(10) Patent No.: US 12,799,969 B2
(45) Date of Patent: Nov. 17, 2026

(54) SERVICEABLE ROUND POST FASTENER

(71) Applicant: Illinois Tool Works Inc., Glenview, IL (US)

(72) Inventor: Mark A. Beyer, Armada, MI (US)

(73) Assignee: Illinois Tool Works Inc., Glenview, IL (US)

( * ) Notice: Subject to any disclaimer, the term of this patent is extended or adjusted under 35 U.S.C. 154(b) by 410 days.

(21) Appl. No.: 18/408,896

(22) Filed: Jan. 10, 2024

(65) Prior Publication Data

US 2024/0247672 A1 Jul. 25, 2024

Related U.S. Application Data

(60) Provisional application No. 63/440,932, filed on Jan. 25, 2023.

(51) Int. Cl.

| | |
|---|---|
| ***F16B 21/10*** | (2006.01) |
| ***F16B 5/06*** | (2006.01) |
| ***F16B 21/08*** | (2006.01) |
| ***F16B 21/20*** | (2006.01) |

(52) U.S. Cl.

CPC ............ *F16B 21/10* (2013.01); *F16B 5/0657* (2013.01); *F16B 21/20* (2013.01); *F16B 21/08* (2013.01)

(58) Field of Classification Search

CPC .......... F16B 21/08; F16B 21/10; F16B 21/20; F16B 5/06; F16B 5/0657; F16B 5/0664

See application file for complete search history.

(56) References Cited

U.S. PATENT DOCUMENTS

| | | | | | |
|---|---|---|---|---|---|
| RE21,769 | E | * | 4/1941 | Tinnerman | F16B 37/041 411/524 |
| 2,321,158 | A | * | 6/1943 | Rees | F16B 21/20 411/521 |
| 4,626,009 | A | * | 12/1986 | Burnett | F16B 37/0857 292/327 |
| 4,911,594 | A | * | 3/1990 | Fisher | F16B 37/02 411/941 |
| 5,195,860 | A | * | 3/1993 | Steyn | F16B 21/20 411/526 |
| 5,833,422 | A | * | 11/1998 | Haga | F16B 21/20 411/521 |

(Continued)

*Primary Examiner* — Nicholas L Foster

(74) *Attorney, Agent, or Firm* — McAndrews, Held & Malloy, Ltd.

(57) ABSTRACT

Disclosed is a push-on fastener assembly to couple a first component to a second component via a post associated with the second component. The push-on fastener assembly is a multi-component push-on fastener assembly having a first retainer and a second retainer. The first retainer has a first annular body with a first topside surface and a first underside surface. The first annular body defines a first opening and a first plurality of retainer fingers coupled to the first annular body and canted upwardly away from the first topside surface at a first angle. The second retainer has a second annular body with a second topside surface and a second underside surface. The second annular body defines a second opening, a second plurality of retainer fingers coupled to the second annular body and canted upwardly away from the second topside surface at a second angle, and one or more retainer legs to secure the first retainer relative to the second retainer.

20 Claims, 10 Drawing Sheets

(56) References Cited

U.S. PATENT DOCUMENTS

Figure 1A:
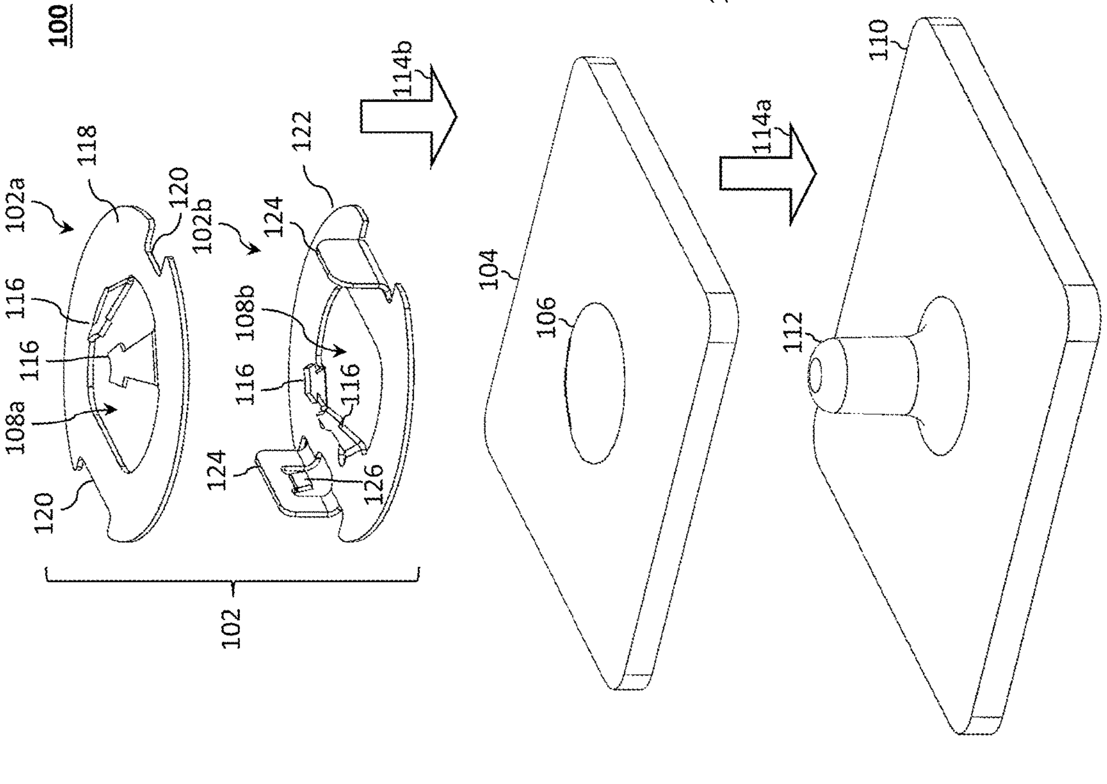

| | | | | | |
|---|---|---|---|---|---|
| 5,897,281 | A * | 4/1999 | Haga | F16B 37/0842 | 411/521 |
| 7,207,762 | B2 * | 4/2007 | Teal | F16B 37/065 | 411/113 |
| 7,435,099 | B2 * | 10/2008 | Kirkus | H01R 9/16 | 206/722 |
| 8,920,089 | B1 * | 12/2014 | Stewart | F16B 5/0208 | 411/433 |
| 8,979,456 | B2 * | 3/2015 | Soriano | F16B 37/02 | 411/521 |
| 9,435,363 | B2 * | 9/2016 | Stewart | F16B 41/002 | |
| 12,092,145 | B2 * | 9/2024 | Jessop | F16B 37/0842 | |
| 2005/0135896 | A1 * | 6/2005 | Teal | F16B 37/065 | 411/183 |
| 2008/0153342 | A1 * | 6/2008 | Kirkus | H05K 7/1061 | 439/357 |
| 2015/0078858 | A1 * | 3/2015 | Stewart | F16B 5/0208 | 411/271 |
| 2022/0243757 | A1 * | 8/2022 | Jessop | F16B 37/0842 | |
| 2024/0384743 | A1 * | 11/2024 | Beyer | F16B 21/20 | |
| 2025/0180049 | A1 * | 6/2025 | Beyer | F16B 21/065 | |

* cited by examiner

SERVICEABLE ROUND POST FASTENER

CROSS-REFERENCE

The present application claims priority to U.S. Provisional Patent Application No. 63/440,932, filed Jan. 25, 2023, and entitled “Serviceable Round Post Fastener,” which is hereby incorporated by reference in its entirety.

BACKGROUND

Automotive components require fastening techniques that are simple to manufacture and assemble. Further, fastening techniques should above all be reliable and efficient. In order to secure component (e.g., a secondary panel and a primary panel), a post retainer may be used to engage a post.

In some examples, a push-on fastener features inner retainer fingers that bite into the material of the post upon which they are applied to provide maximum holding strength. Such push-on fastener are useful in that they can be easily applied with minimal a push-on force. Push-on fastener are self-locking and are used in applications where screws or bolts need to be retained in place before a nut is put in place and tightened.

Typically, push-on fasteners cannot be removed without damaging or scoring the post and, therefore, are typically not suitable for applicable where the push-on fastener needs to be removed periodically. For example, if the push-on fastener is used in an application that requires periodic servicing, using a traditional push-on fastener will harm or destroy the post over time, thus resulting in a poor or non-existent connection.

Therefore, despite various advancements to date, it would nevertheless be desirable to provide a push-on fastener that can be removed without materially harming or damaging the post.

SUMMARY

The present disclosure relates generally to a push-on fastener assembly, substantially as illustrated by and described in connection with at least one of the figures, as set forth more completely in the claims. More particularly, to a push-on fastener assembly that can be removed without damage or scoring to the post.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

Figure 1B:
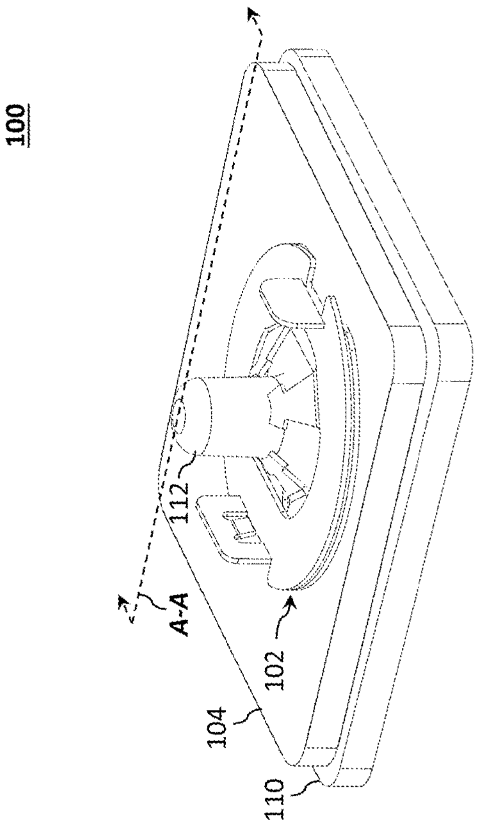

FIGS. 1*a* and 1*b* illustrate, respectively, isometric assembly and assembled views of an example fastening system in accordance with an aspect of this disclosure.

Figure 1C:
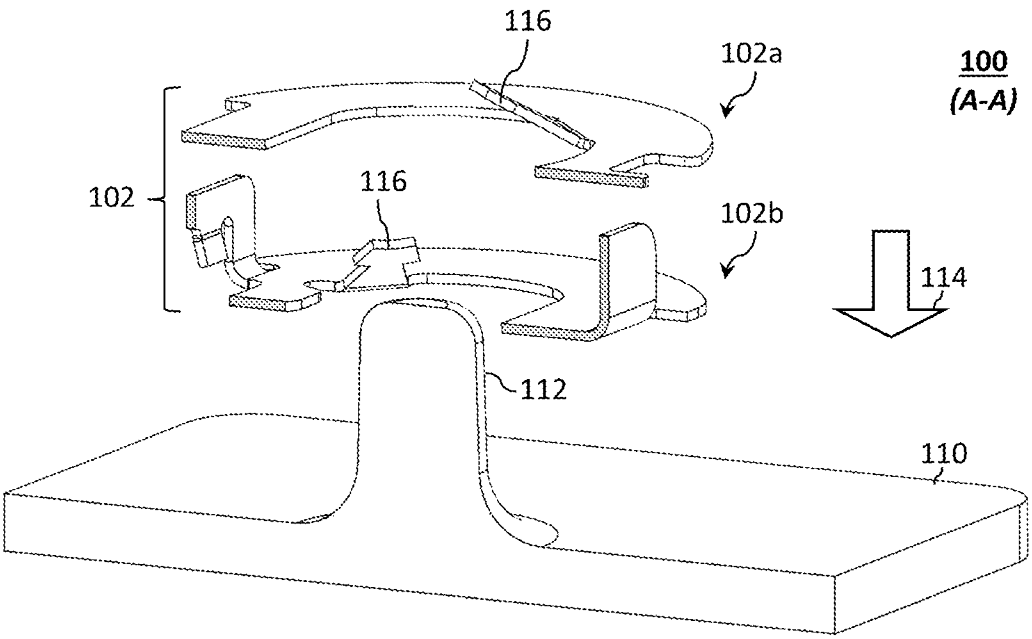
Figure 1D:
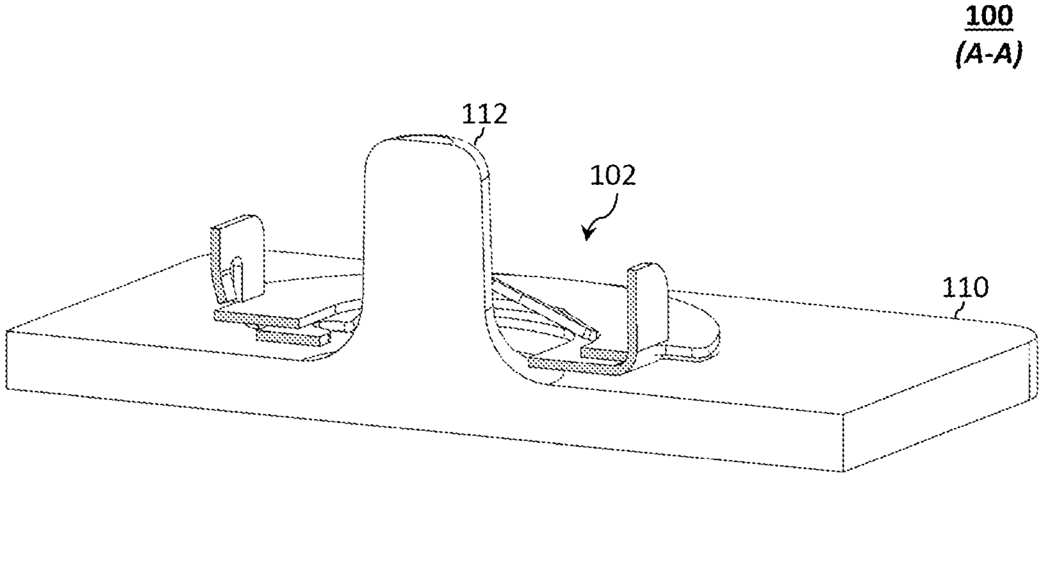

FIGS. 1*c* and 1*d* illustrate, respectively, cross-sectional isometric assembly and assembled views of the example fastening system of FIGS. 1*a* and 1*b* taken along cutline A-A.

Figure 2B:
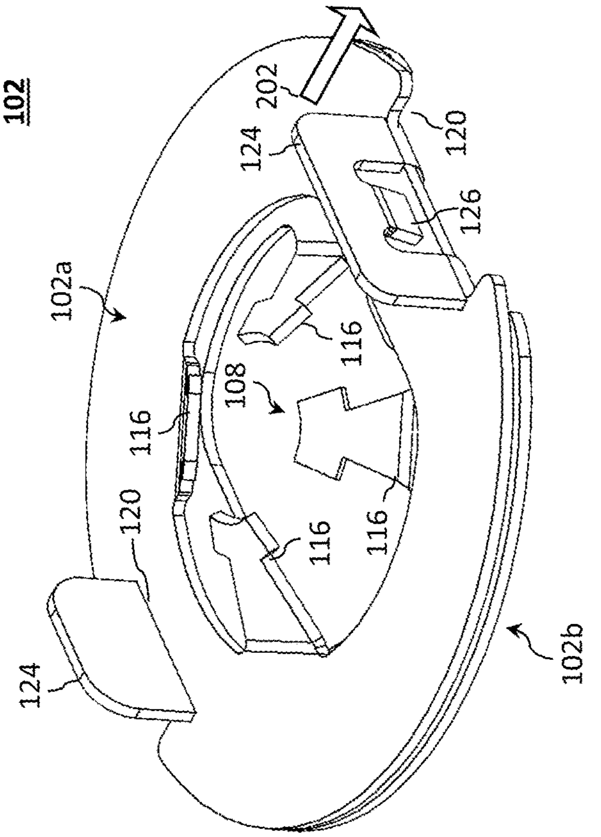
Figure 2A:
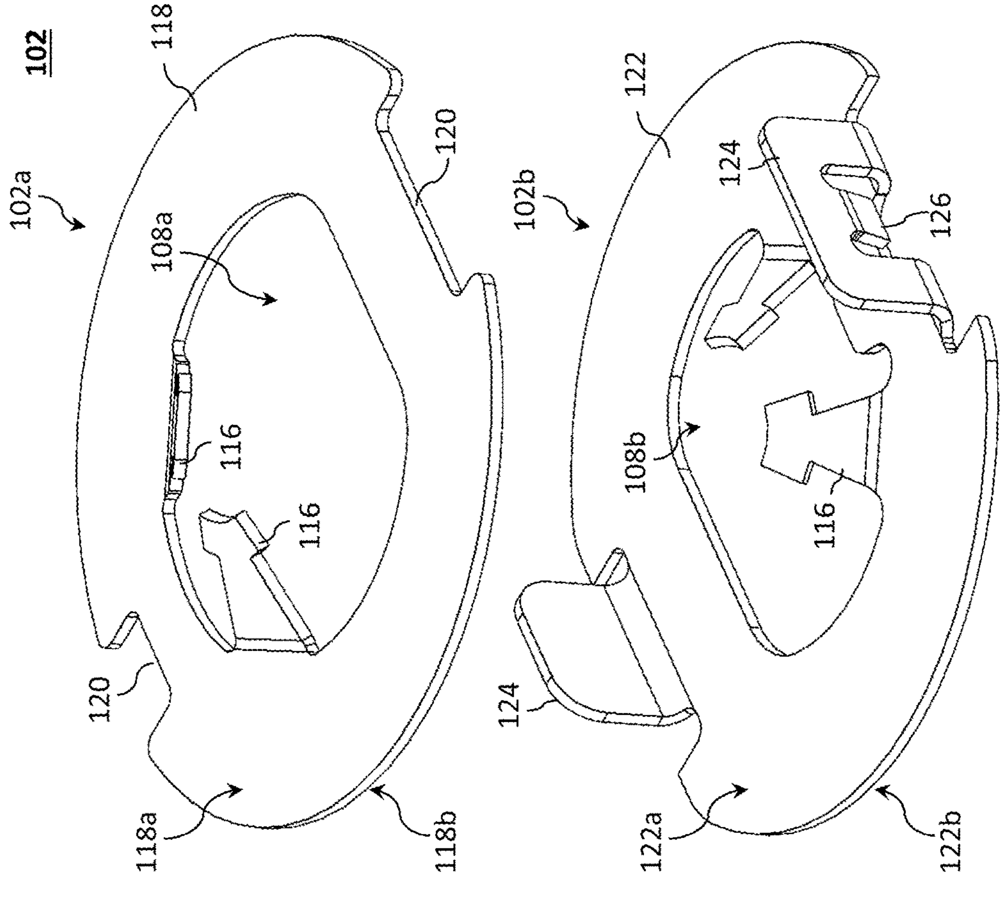
Figure 2C:
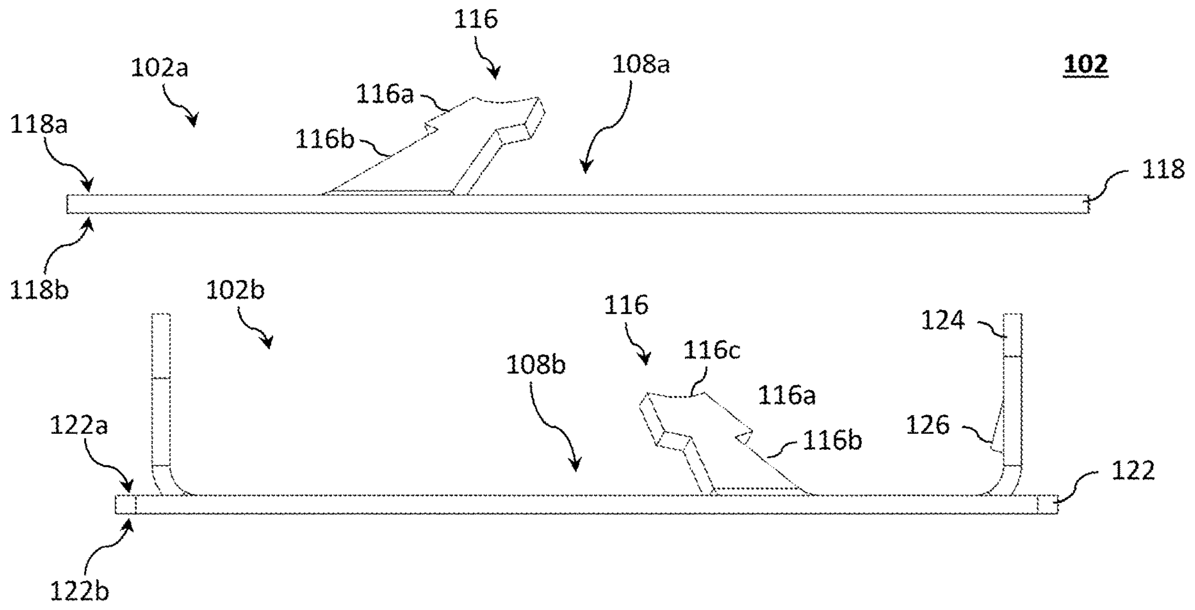
Figure 2D:
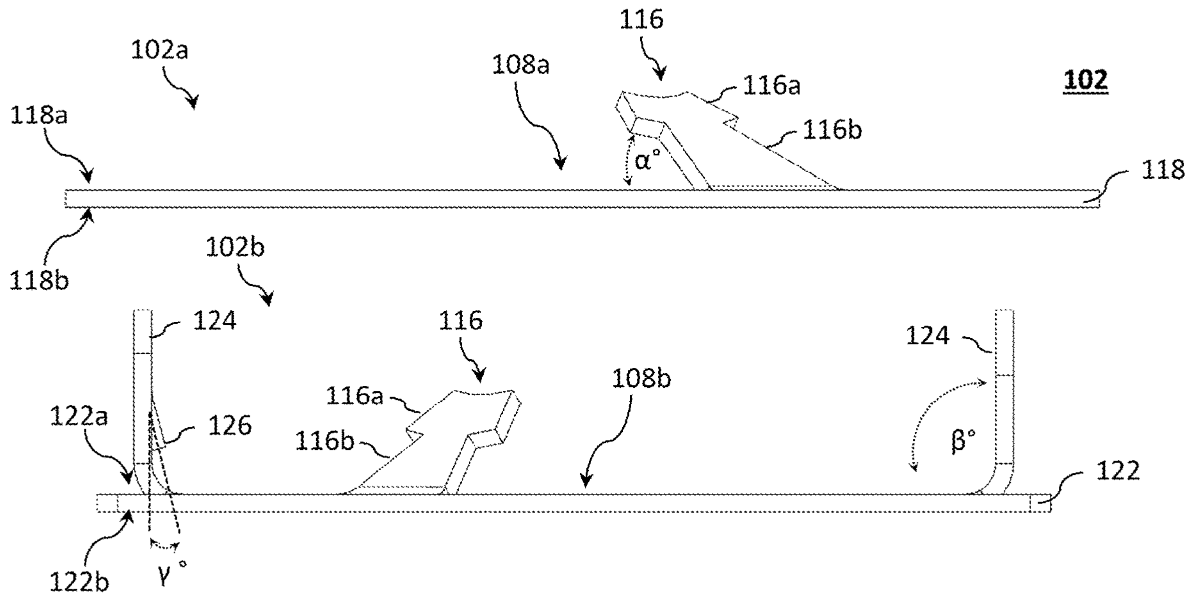
Figure 2E:
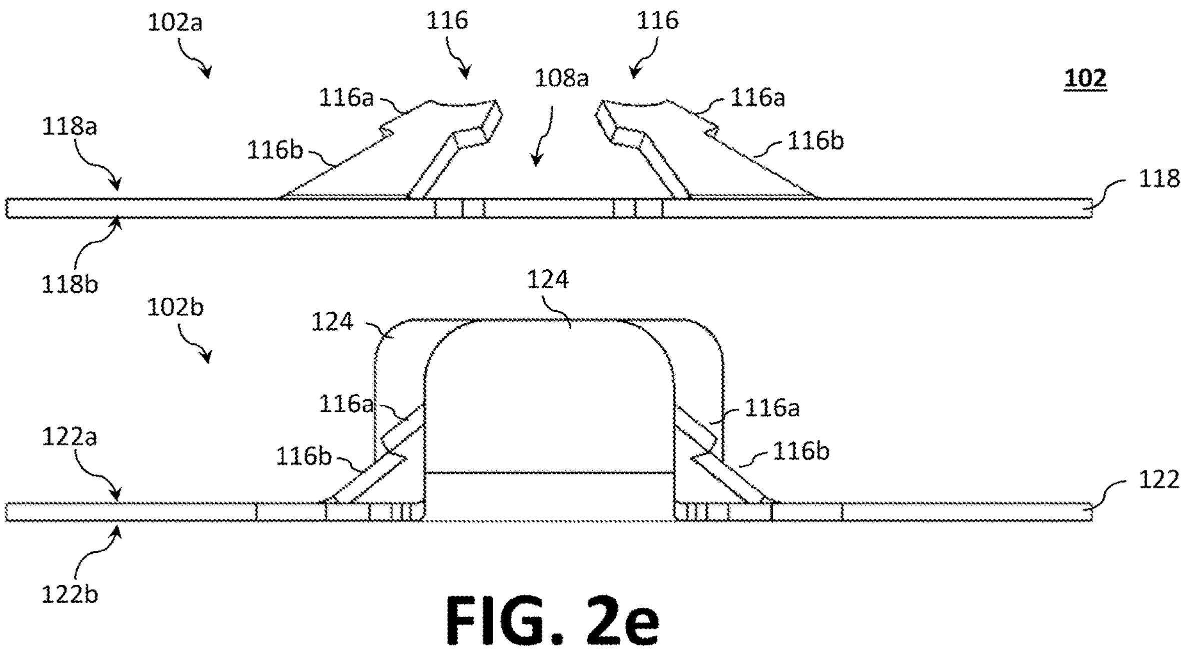
Figure 2F:
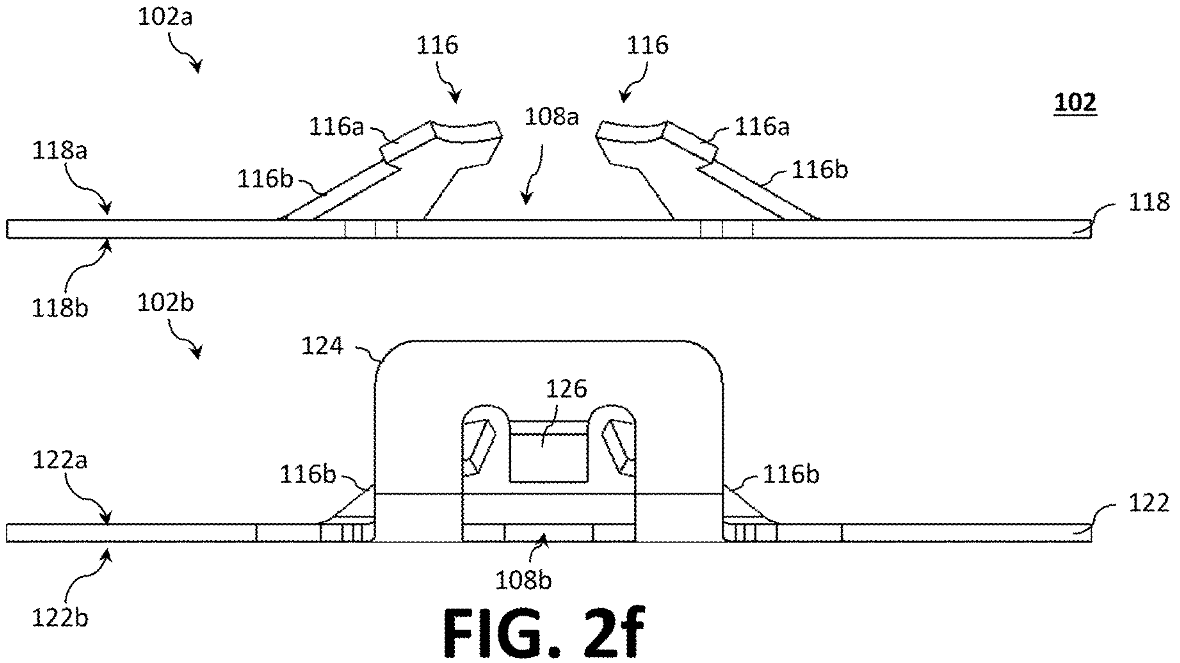

FIGS. 2*a* and 2*b* illustrate, respectively, topside isometric assembly and assembled views of the push-on fastener assembly of FIGS. 1*a* through 1*d*.

FIGS. 2*c* through 2*f* illustrate, respectively, first, second, third, and fourth side elevation views of the push-on fastener assembly.

Figure 2G:
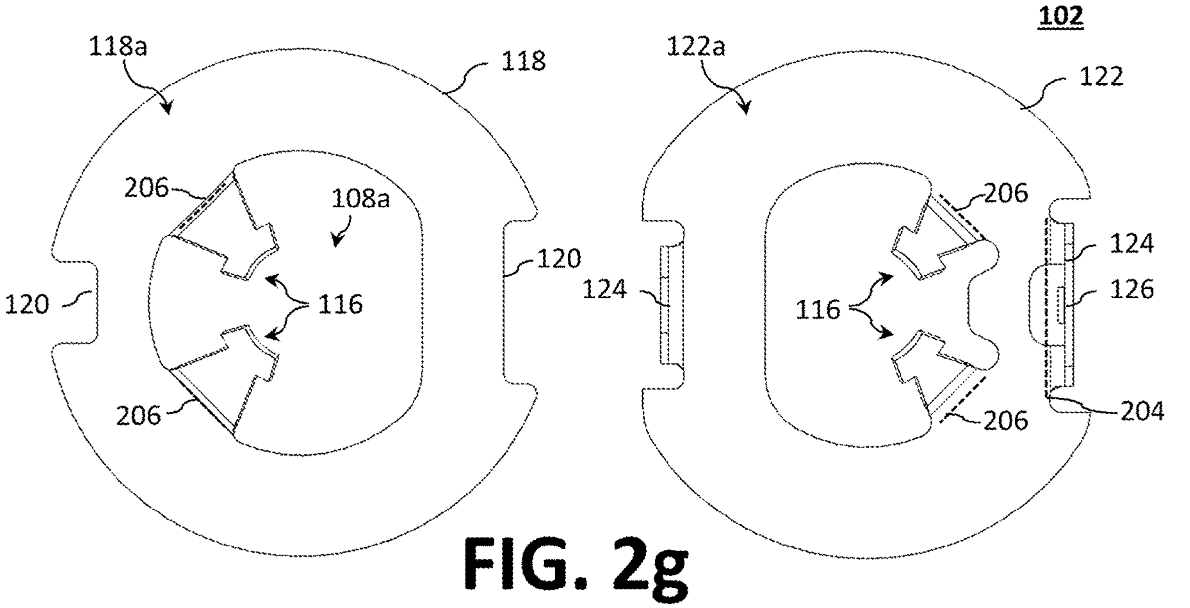
Figure 2H:
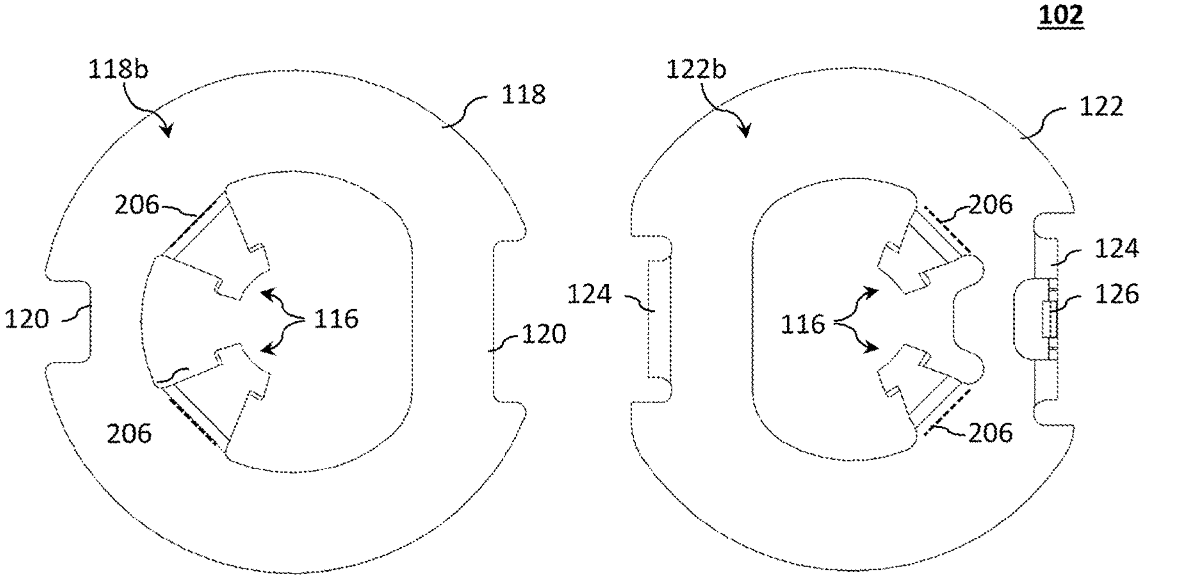

FIGS. 2*g* and 2*h* illustrate, respectively, topside and underside plan views of the push-on fastener assembly.

Figure 2I:
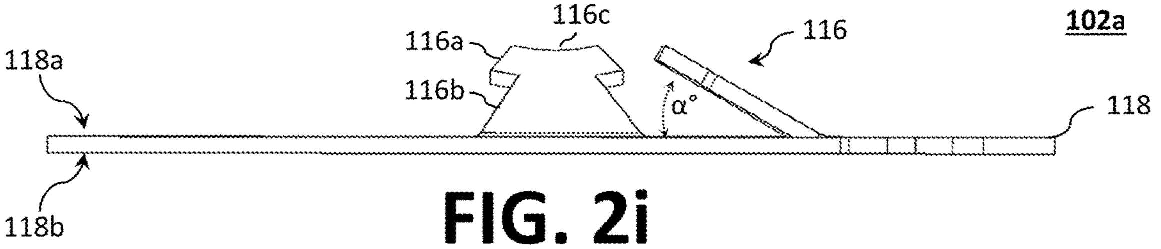

FIG. 2*i* illustrates a side elevation view of the retainer fingers of a first retainer of the push-on fastener assembly.

Figure 3B:
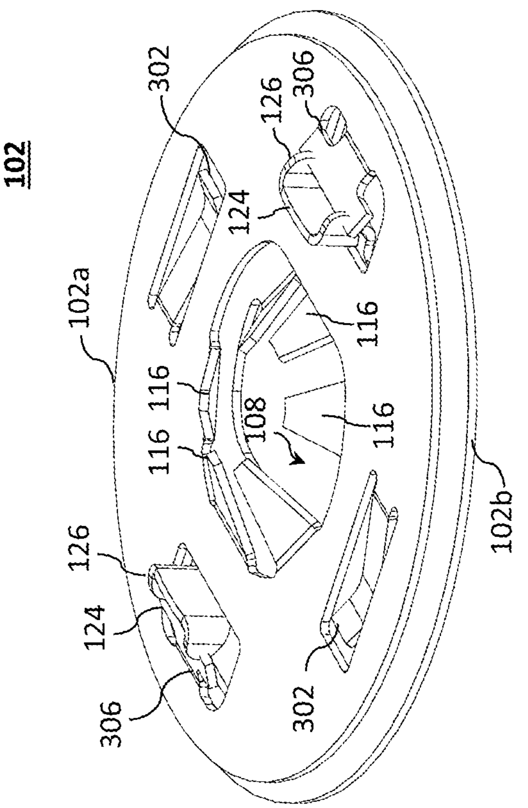
Figure 3A:
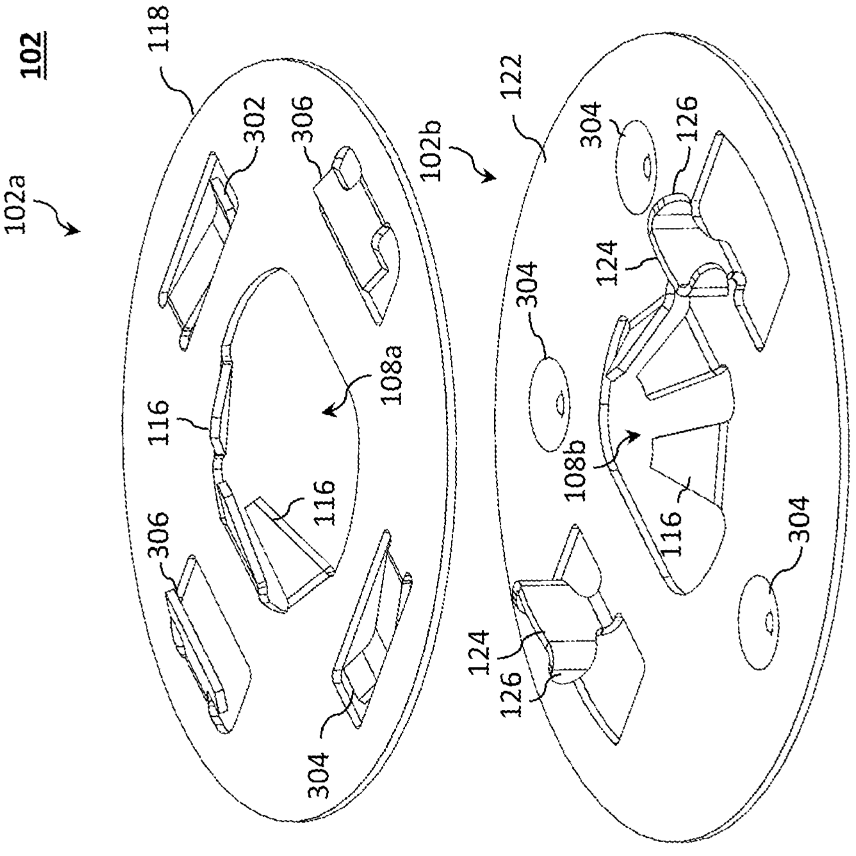

FIGS. 3*a* and 3*b* illustrate, respectively, topside isometric assembly and assembled views of the push-on fastener assembly in accordance with another aspect of this disclosure.

FIGS. 3*c* through 3*f* illustrate, respectively, first, second, third, and fourth side elevation views of the push-on fastener assembly of FIGS. 3*a* and 3*b*.

Figure 3C:
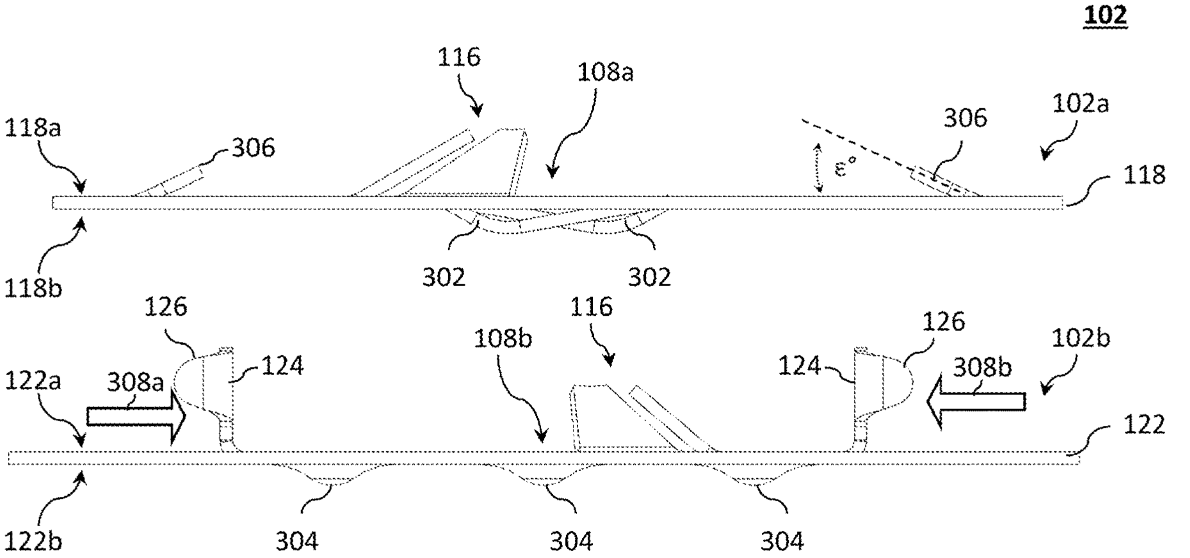
Figure 3D:
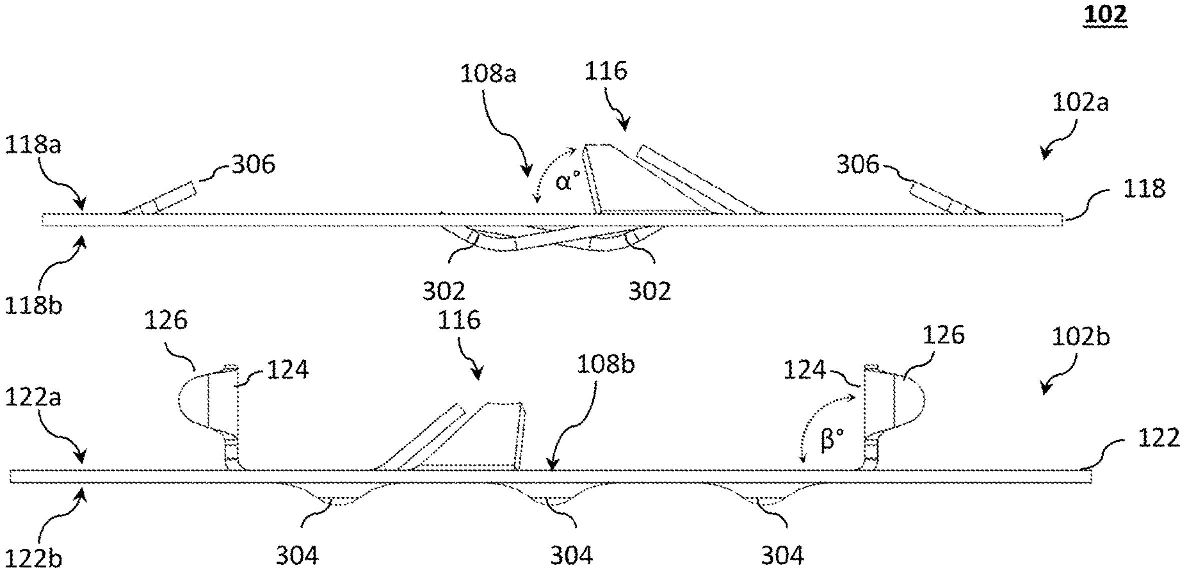
Figure 3E:
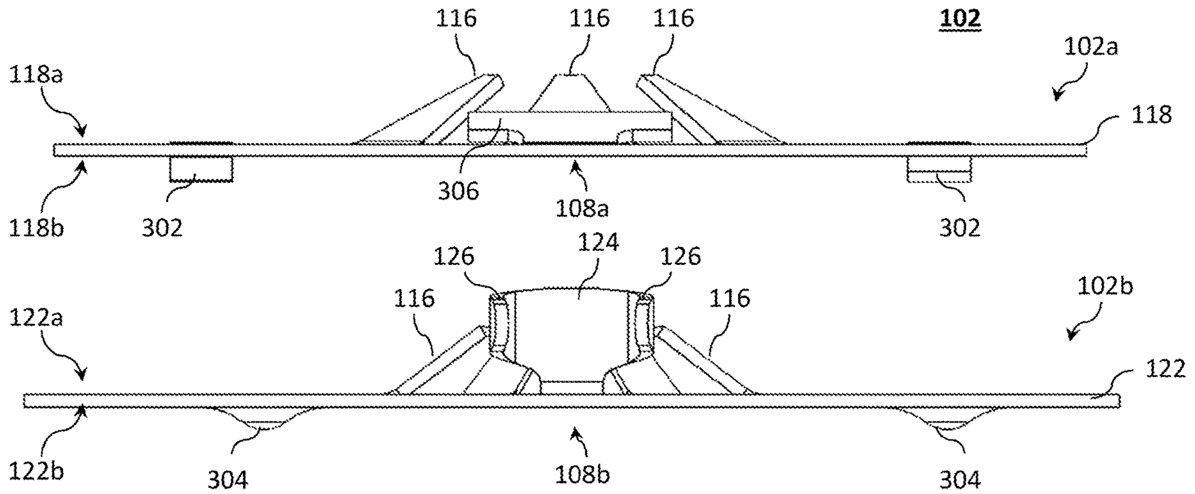
Figure 3F:
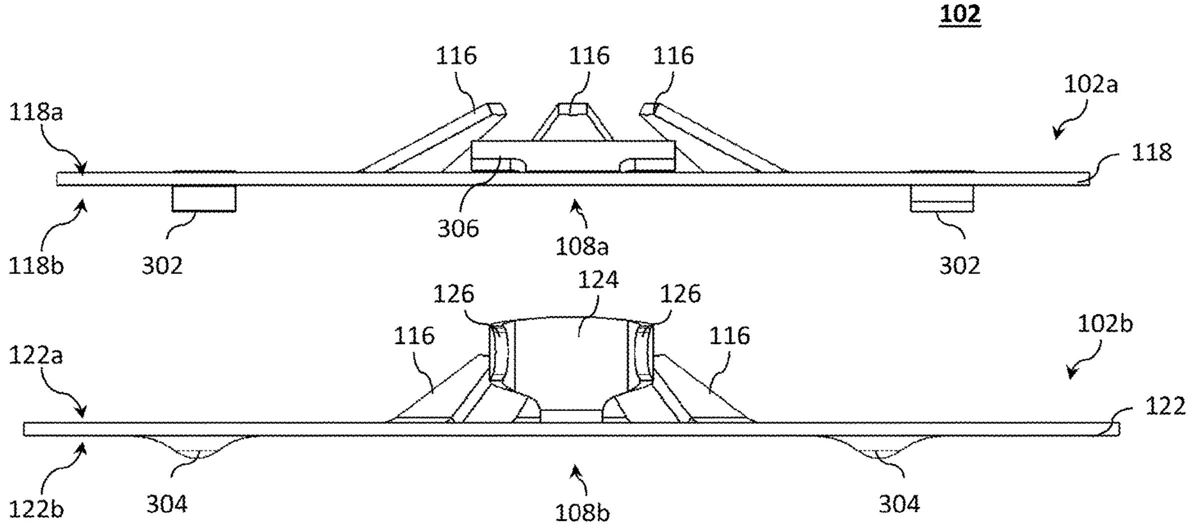
Figure 3G:
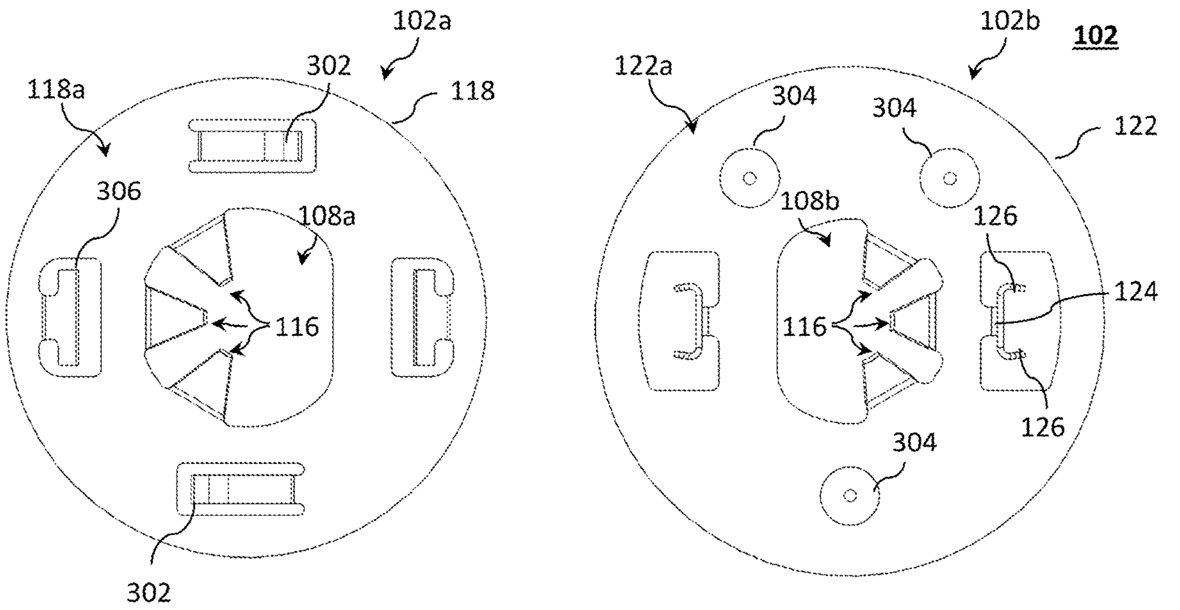
Figure 3H:
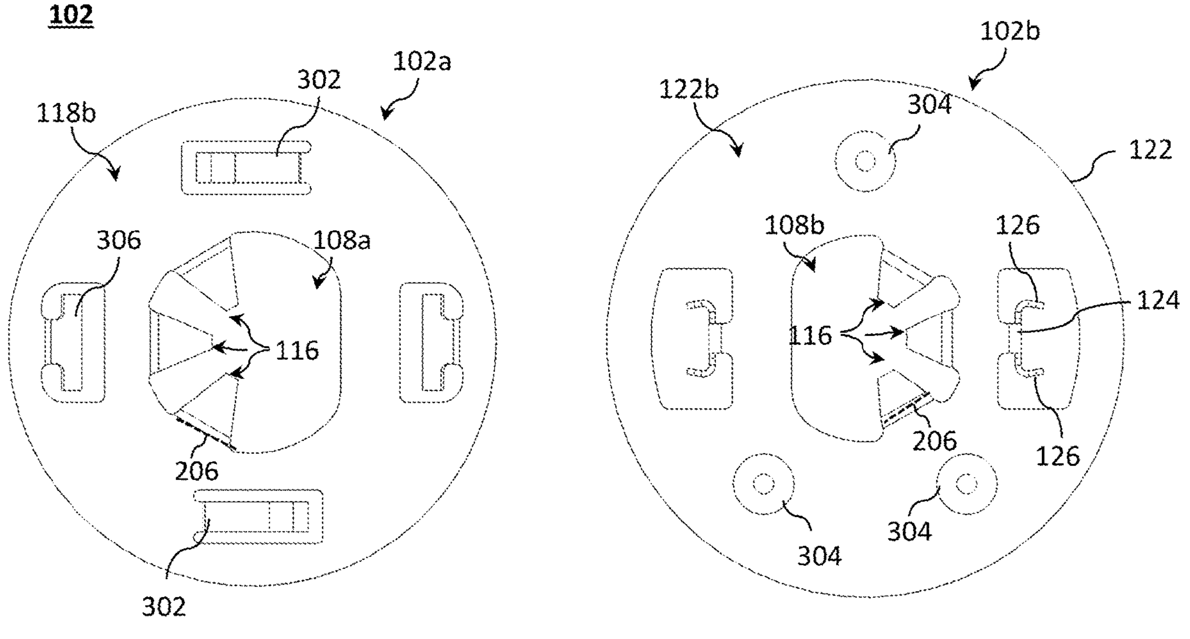

FIGS. 3*g* and 3*h* illustrate, respectively, topside and underside plan views of the push-on fastener assembly of FIGS. 3*a* and 3*b*.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as “first,” “second,” “top,” “bottom,” “side,” “front,” “back,” and the like are words of convenience and are not to be construed as limiting terms. For example, while in some examples a first side is located adjacent or near a second side, the terms “first side” and “second side” do not imply any specific order in which the sides are ordered.

The terms “about,” “approximately,” “substantially,” or the like, when accompanying a numerical value, are to be construed as indicating a deviation as would be appreciated by one of ordinary skill in the art to operate satisfactorily for an intended purpose.

Ranges of values and/or numeric values are provided herein as examples only, and do not constitute a limitation on the scope of the disclosure. The use of any and all examples, or exemplary language (“e.g.,” “such as,” or the like) provided herein, is intended merely to better illuminate the disclosed examples and does not pose a limitation on the scope of the disclosure. The terms “e.g.,” and “for example” set off lists of one or more non-limiting examples, instances, or illustrations. No language in the specification should be construed as indicating any unclaimed element as essential to the practice of the disclosed examples.

The term “and/or” means any one or more of the items in the list joined by “and/or.” As an example, “x and/or y” means any element of the three-element set {(x), (y), (x, y)}. In other words, “x and/or y” means “one or both of x and y”. As another example, “x, y, and/or z” means any element of the seven-element set {(x), (y), (z), (x, y), (x, z), (y, z), (x, y, z)}. In other words, “x, y, and/or z” means “one or more of x, y, and z.”

The deficiencies of existing push-on fasteners include their lack of serviceability. That is, in order to service a component, removing existing push-on fastener often requires destroying the push-on fastener and/or the attachment post. For example, while a push-on fastener is easily installed by pushing it onto a post, removal (e.g., through a pulling motion) often damages the post during this operation.

Therefore, disclosed is an improved push-on fastener assemblies that offers, inter alia, the advantage of serviceability. The disclosed push-on fastener assemblies are serviceable both in terms of preventing damage to the post and in preventing damage to the push-on fastener assembly during removal. Accordingly, the disclosed push-on fastener assembly can be reused as it is not damaged during removal.

In one example, a push-on fastener assembly to couple a first component to a second component via a post associated with the second component comprises: a first retainer having a first annular body with a first topside surface and a first underside surface, wherein the first annular body defines a first opening and a first plurality of retainer fingers coupled to the first annular body and canted away from the first topside surface at a first angle; and a second retainer having a second annular body with a second topside surface and a second underside surface, wherein the second annular body defines a second opening, a second plurality of retainer fingers coupled to the second annular body and canted away from the second topside surface at a second angle, and one or more retainer legs configured to secure the first retainer relative to the second retainer.

In another example, a push-on fastener assembly to couple a first component to a second component via a post associated with the second component comprises: a first stamped-metal retainer having a first annular body with a first topside surface and a first underside surface, wherein the first annular body defines a first opening and a first plurality of retainer fingers coupled to the first annular body and canted away from the first topside surface at a first angle; and a second stamped-metal retainer having a second annular body with a second topside surface and a second underside surface, wherein the second annular body defines a second opening, a second plurality of retainer fingers coupled to the second annular body and canted away from the second topside surface at a second angle, and one or more retainer legs configured to secure the first stamped-metal retainer relative to the second stamped-metal retainer, wherein the first opening and the second opening align to define a retainer opening when the first stamped-metal retainer is secured to the second stamped-metal retainer, and wherein at least one of the one or more retainer legs comprises an engagement feature configured to engage the first stamped-metal retainer.

In yet another example, a push-on fastener assembly to couple a first component to a second component via a post associated with the second component comprises: a first stamped-metal retainer having a first annular body with a first topside surface and a first underside surface, wherein the first annular body defines a first opening and a first plurality of retainer fingers coupled to the first annular body and canted away from the first topside surface at a first angle; and a second stamped-metal retainer having a second annular body with a second topside surface and a second underside surface, wherein the second annular body defines a second opening, a second plurality of retainer fingers coupled to the second annular body and canted away from the second topside surface at a second angle, and one or more retainer legs configured to secure the first stamped-metal retainer relative to the second stamped-metal retainer, wherein the first opening and the second opening align to define a retainer opening when the first stamped-metal retainer is secured to the second stamped-metal retainer, and wherein at least one of the one or more retainer legs comprises an engagement feature configured to engage the first stamped-metal retainer and configured to release the first stamped-metal retainer from the second stamped-metal retainer when biased.

In some examples, at least one of the one or more retainer legs comprises an engagement feature configured to engage the first retainer.

In some examples, the engagement feature is configured to engage the first retainer via a notch formed in the first retainer.

In some examples, the engagement feature is a clip.

In some examples, the engagement feature is configured to engage the first retainer via a clip formed in or on the first retainer.

In some examples, the engagement feature is a catch.

In some examples, the first retainer comprises a plurality of spacers configured to main a gap between the first underside surface and the second topside surface.

In some examples, the second retainer comprises a plurality of spacers configured to main a gap between the second underside surface and the first component.

In some examples, each of the first plurality of retainer fingers and the second plurality of retainer fingers comprises a resilient leg with a head that defines a distal edge configured to engage the post.

In some examples, each of the first opening and the second opening are clipped circular openings.

In some examples, the first opening and the second opening align to define a retainer opening when the first retainer is secured to the second retainer.

In some examples, the first angle and the second angle are each between 15 and 45 degrees.

In some examples, each of the first retainer and the second retainer are a stamped-metal component.

In some examples, the one or more retainer legs are configured to release the first retainer from the second retainer when biased.

FIGS. 1*a* and 1*b* illustrate, respectively, isometric assembly and assembled views of an example fastening system 100 in accordance with an aspect of this disclosure, while FIGS. 1*c* and 1*d* illustrate, respectively, cross-sectional isometric assembly and assembled views of the example fastening system 100 of FIGS. 1*a* and 1*b* taken along cutline A-A. As illustrated, the fastening system 100 includes a push-on fastener assembly 102 configured to join a first component 104 to a second component 110 via a post 112 (or stud, bolt, threaded shaft, etc.) associated with the second component 110. The first component 104 is omitted from FIGS. 1*c* and 1*d* for illustrative purposes, but a non-limiting example is represented in FIGS. 1*a* and 1*b*.

While only a single push-on fastener assembly 102 is illustrated in the examples, it should be appreciated that multiple retainer assemblies 102 and posts 112 may be used to couple a first component 104 to a second component 110, depending on the number of fastener points needed between the first and second components 104, 110. For example, larger components and panels typically require multiple fastening points.

The first component 104 and the second component 110 may be, for example, automotive panels. Depending on the application, the first component 104 and the second component 110 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In the automotive industry, example first components 104 include, without limitation, door trim panels, moldings, trim pieces, and other substrates (whether used as interior or exterior surfaces). The second component 110 may be, for example, a structural component of a vehicle, such as doors, pillars (e.g., an A-pillar, B-pillar, C-pillar, etc.), dashboard components (e.g., a cross member, bracket, frame, etc.), seat frames, center consoles, fenders, sheet metal framework, or the like.

The first component 104 includes one or more panel openings 106 configured to receive the post 112, while the second component 110 includes one or more posts 112 configured to engage the one or more retainer assemblies 102. The opening 106 can be formed in the first component 104 during manufacturing thereof or added post-manufacture through a mechanical process (e.g., drilling, cutting, carving, etc.). As illustrated, each of the one or more posts 112 is generally perpendicular to the second component 110. The push-on fastener assembly 102 may be fabricated from a generally rigid material, such as metal, synthetic or semi-synthetic polymers, composite materials, or a combination thereof. In some examples, as will be discussed, the push-on fastener assembly 102 is fabricated from a sheet of metal using a metal stamping and bending process.

Depending on the material type, the one or more posts 112 may be formed during casting, molding, or layup of the second component 110, or attached after fabrication (e.g., using adhesive or mechanical fasteners). In some examples, the second component 110 and its one or more posts 112 are cast structures. A cast structure, in an automotive context, refers to a frame, chassis, or other component that is produced using a casting process. The choice of metal for casting can vary but often includes materials like iron or aluminum.

During assembly, the first component 104 can be pushed onto the post 112 in the direction indicated by arrow 114*a* such that the post 112 passes through the first opening 106 formed in the first component 104 (or vice versa, for example, where the first component 104 is stationary and the second component is moved relative to the first component 104). The push-on fastener assembly 102 can then be similarly pushed onto the post 112 in the direction indicated by arrow 114*b*, thus securing the first component 104 relative to the second component 110. After assembly, as best illustrated in FIG. 1*b*, the second component 110 is covered at least partially by the first component 104.

As illustrated, the push-on fastener assembly 102 is configured as a multi-component push-on fastener assembly 102 having a first retainer 102*a* and a second retainer 102*b*. During assembly, the first retainer 102*a* and the second retainer 102*b* are preassembled (e.g., connected to one another) to define the push-on fastener assembly 102 prior to installation of the push-on fastener assembly 102 onto the post 112. The first retainer 102*a* defines a first opening 108*a* and the second retainer 102*b* defines a second opening 108*b*. When assembled, the first and second retainers 102*a*, 102*b* snap together such that their first and second openings 108*a*, 108*b* align to define the retainer opening 108.

The details and features of the push-on fastener assembly 102 are better-illustrated in connection with FIGS. 2*a* through 2*i*. Specifically, FIGS. 2*a* and 2*b* illustrate, respectively, topside isometric assembly and assembled views of the push-on fastener assembly 102 of FIGS. 1*a* through 1*d*. FIGS. 2*c* through 2*f* illustrate, respectively, first, second, third, and fourth side elevation views of the push-on fastener assembly 102, while FIGS. 2*g* and 2*h* illustrate, respectively, topside and underside plan views of the push-on fastener assembly 102. Finally, FIG. 2*i* illustrates a side elevation view of the retainer fingers 116 of a first retainer of the push-on fastener assembly 102.

The first retainer 102*a* generally comprises a first annular body 118 that defines the first opening 108*a*, one or more retainer fingers 116 (a first plurality, as illustrated) configured to engage the post 112, and one or more notches 120 (e.g., cut outs, recesses, etc.) configured to engage the second retainer 102*b*. As illustrated, the first annular body 118 is generally planar and defines a first topside surface 118*a* and a first underside surface 118*b*. In the illustrated example, the one or more notches 120 are generally rectangular cutouts. In some examples, one or more retention features can be positioned in addition to or in lieu of the one or more notches 120 (an example of which is illustrated and described in connection with FIG. 3*a* through 3*h*). The second retainer 102*b* is similar to the first retainer 102*a* in that it generally comprises a second annular body 122 that defines the second opening 108*b* and one or more retainer fingers 116 (a second plurality, as illustrated) to engage the post 112; however, the second annular body 122 further defines one or more retainer legs 124 (e.g., up-turned legs) to engage and retain the first retainer 102*a* via its one or more notches 120. As illustrated, the second annular body 122 is also generally planar and defines a second topside surface 122*a* and a second underside surface 122*b*.

As illustrated, the first annular body 118 and the second annular body 122 generally resemble a washer—i.e., a circular flat body with its respective first and second openings 108*a*, 108*b* at the centers of the circular flat body. The first and second openings 108*a*, 108*b* can be circular opening or, as illustrated, a clipped circular opening (e.g., D-shaped). The first and the second annular bodies 118, 122 provide a flat, planar surface that allows a tool to push the push-on fastener assembly 102 onto the post 112.

The retainer fingers 116 of the push-on fastener assembly 102 are formed from or on the first and second annular bodies 118, 122. As illustrated, each of the retainer fingers 116 is canted upward relative to its respective first or second annular body 118 (e.g., canted away from the first topside surface 118*a* and second topside surface 122*a*). Notably, the retainer fingers 116 positioned on the first annular body 118 mirror those on the second annular body 122 such that, when assembled, the retainer fingers 116 are distributed around the retainer opening 108 and the retainer fingers 116 do not overlap. Positioning the retainer fingers 116 of the first annular body 118 on a side opposite that of the retainer fingers 116 positioned on second annular body 122 allows for release of the post 112 when the push-on fastener assembly 102 is disassembled. In other words, the first retainer 102*a* can provide the retainer fingers 116 for a first half of the circumference of the retainer opening 108, while the second retainer 102*b* can provide the retainer fingers 116 for a second half (i.e., the other half) of the circumference of the retainer opening 108.

In the illustrated example, the two retainer fingers 116 positioned on the first annular body 118 are positioned on one side of the retainer opening 108 (and post 112) and the two retainer fingers 116 positioned on the second annular body 122 are positioned on the other side of the retainer opening 108. Collectively, the four retainer fingers 116 are distributed 90 degrees about the retainer opening 108, however, as best illustrated in FIGS. 2*g* and 2*h*, the two retainer fingers 116 positioned on each of the first and second annular bodies 118, 122 are adjacent one another and spaced 45 degrees about the retainer opening 108. While a total of four retainer fingers 116 are illustrated (i.e., two on each of the first and second annular bodies 118), the total number of retainer fingers 116 positioned around the retainer opening 108 of the push-on fastener assembly 102 can be increased or decreased based on the retention and insertion forces needed (or desired) relative to the post 112.

The one or more retainer fingers 116 extend inward toward a center of the retainer opening 108 and are canted upwardly away from the first and second topside surfaces 118*a*, 122*a* of the first and second annular bodies 118, 122 at an angle (α). In the illustrated example, the retainer fingers 116 positioned on the first retainer 102*a* are the same size, shape, and angle (α) as the retainer fingers 116 on the second retainer 102*b*; however, they need not match if desired.

The angle (α) may be for example, about 15 to 45 degrees, about 20 to 40 degrees, or about 30 degrees (as illustrated). By angling the one or more retainer fingers 116 upward away from the first topside surface 118*a* of the first annular body 118 at the angle (α), the push-on fastener assembly 102 can slide over the post 112 during assembly without requiring excessive assembly force, but, once assembled, the push-on fastener assembly 102 cannot easily slide off the post 112 as the angle (α) causes the one or more retainer fingers 116 to, in effect, dig into the post 112 at or near its base end 112*b* until either (1) a sufficient pull force is applied at the push-on fastener assembly 102 to overcome the engagement between the one or more retainer fingers 116 and the post 112 or (2) the push-on fastener assembly 102 is disassembled for removal, as will be described.

The retainer fingers 116 secure the post 112 via an interference fit. As best illustrated in FIG. 2*i*, each of the retainer fingers 116 is illustrated as having a head 116*a* positioned the end of a resilient leg 116*b*. The distal edge 116*c* of each of the retainer fingers 116 is configured to engage and hold onto the post 112 via the interference fit when the post 112 is at or near the center of the retainer opening 108. The distal edge 116*c* of the head 116*a* can be shaped to compliment an exterior surface shape or contour of the post 112 (e.g., curved) to increase surface area contact with and/or to dig into an exterior surface of the post 112. The flexibility and angle of the retainer fingers 116 provide tolerance compensation for slightly different sized posts 112.

The shape of the retainer fingers 116, including length, width, and thickness, however, can be varied to change push-on and retention forces. For example, as illustrated in FIG. 3*a* through 3*h*, the shape of the retainer fingers 116, can be generally trapezoidal. In some examples, cutouts can be added to the retainer fingers 116 to reduce the forces and allow for more flexibility (and to reduce material usage). Including the cutouts decreases rigidity of the material to thereby allow the material to more easily deflect during installation or assembly. For example, the cutouts may be circular and positioned at a finger bend line 206, i.e., where the retainer leg 124 attaches and flexes relative to the first and second annular bodies 118, 122.

The one or more retainer legs 124 are configured to engaged and capture (or otherwise secure) the first retainer 102*a* relative to the second retainer 102*b*. The one or more retainer legs 124 are formed from or on the second annular body 122 and extend upwardly away from topside surface 122*a* of the second annular body 122. In the illustrated example, the one or more retainer legs 124 bent upwardly (away from the second annular body 122) at an angle (B). The angle (B) may be for example, about 90 to 110 degrees, about 90 to 100 degrees, or about 90 degrees (as illustrated). That is, the one or more retainer legs 124 are illustrated generally perpendicular to a plane defined by the second annular body 122. In some examples, cutouts can be added to the retainer legs 124 to reduce the forces and allow for more flexibility (and to reduce material usage). For example, the cutouts may be circular and positioned at a leg bend line 204, i.e., where the retainer leg 124 attaches and flexes relative to the second annular body 122.

The one or more retainer legs 124 can comprise one or more engagement features 126 to retain the first retainer 102*a* via its one or more notches 120, for example. The one or more engagement features 126 may be, for example, catches, tabs, clips, snaps, etc. In the illustrated example, the engagement feature 126 is a catch punched from the one or more retainer legs 124 and bent inwardly (toward the second opening 108*b*) and oriented to point downwardly (toward the second annular body 122) at an angle (γ). The angle (γ) may be for example, about 5 to 30 degrees, about 10 to 20 degrees, or about 15 degrees (as illustrated). In this example, the engagement feature 126 also forms a cutout to reduce insertion forces of the retainer leg 124.

While two retainer legs 124 are illustrated, the number of retainer legs 124 position around the second opening 108*b* of the second annular body 122 can be increased or decreased based on the retention and insertion forces needed (or desired) relative to the first retainer 102*a*. Further, the general shape of the retainer legs 124, including length, width, and thickness can be varied to change push-on and retention forces.

The first retainer 102*a* and the second retainer 102*b* can each be manufactured as a single component as a stamped-metal component (e.g., via a metal stamping process); however, it is contemplated that they can be manufactured as separate components and joined thereafter (e.g., through adhesives, welding, etc.). Thus, the first retainer 102*a* can be a first unitary structure (e.g., a first stamped-metal retainer), while the second retainer 102*b* can be a second unitary structure (e.g., a second stamped-metal retainer). As illustrated, each of the retainer legs 124 is folded, bent, or otherwise connected to the first annular body 118 at a leg bend line 204 (or fold line), while each of the retainer fingers 116 is folded, bent, or otherwise connected to the first annular body 118 or the second annular body 122 at a finger bend line 206.

The push-on fastener assembly 102 can be disassembled to remove the push-on fastener assembly 102 from the post 112 without causing damage to the post 112 (and enabling reuse of the push-on fastener assembly 102). To disassemble the push-on fastener assembly 102, one or both of the retainer legs 124 can be pushed or biased outwardly (away from the retainer opening 108) such that the one or more engagement features 126 of the second retainer 102*b* disengage the first retainer 102*a* to thereby release the first retainer 102*a*. Once the first retainer 102*a* and second retainer 102*b* are disconnected, the push-on fastener assembly 102 can be slid off the post 112 without harming to the post 112. For example, with reference to FIGS. 2*a* and 2*b*, only one of the two retainer legs 124 includes an engagement feature 126, which can be pushed in the direction indicated by arrow 202 to release the first retainer 102*a*.

FIGS. 3*a* and 3*b* illustrate, respectively, topside isometric assembly and assembled views of the push-on fastener assembly 102 in accordance with another aspect of this disclosure, while FIGS. 3*c* through 3*f* illustrate, respectively, first, second, third, and fourth side elevation views of the push-on fastener assembly 102 and FIGS. 3*g* and 3*h* illustrate, respectively, topside and underside plan views of the push-on fastener assembly 102. The push-on fastener assembly 102 of FIGS. 3*a* through 3*e* is similar to that of FIGS. 1*a* through 1*d* and FIGS. 2*a* through 2*i* but with certain differences and additional features. For example, the push-on fastener assembly 102 further comprises 304 and 302.

While in the prior example the retainer fingers 116 are each illustrated as having a resilient leg 116*b* with a head 116*a*, the shape of the retainer fingers 116, can be additionally or alternatively generally trapezoidal. In addition, the push-on fastener assembly 102 comprises a total of six retainer fingers 116 (i.e., three on each of the first and second annular bodies 118) positioned around the retainer opening 108 of the push-on fastener assembly 102, this increasing points of contact with (and thus retention of) the post 112. Collectively, the six retainer fingers 116 are distributed 60 degrees about the retainer opening 108.

The first and second retainers 102*a*, 102*b* are coupled together using a catch assembly, which can include a clip 306 on one retainer and an engagement feature 126 on the other retainer to capture the clip 306. In this example, the first retainer 102*a* comprises one or more clips 306. As best illustrated in FIGS. 3*c* and 3*d*, each clip 306 can be angled away from the first topside surface 102*a* by an angle (ε). The angle (ε) may be for example, about 10 to 40 degrees, about 20 to 30 degrees, or about 25 degrees (as illustrated). The one or more clips 306 serve a function similar to the notches 120 of the prior example, but the angle (ε) of the clips 306 allows for a gap between the first and second retainers 102*a*, 102*b* when assembled, thus mitigating buzz, squeak, and rattle (BSR). To capture the clips 306, the second retainer's 102*b* retainer legs 124 define one or more engagement feature 126. In the illustrated example, each retainer leg 124 defines two engagement feature 126, each in the form of tab punched with the one or more retainer legs 124 and bent about 90 degrees to form a catch. As illustrated, the catches are oriented such that they point outwardly (away from the retainer opening 108). Thus, the ends of the retainer legs 124 can be bent to define two catches ×14. With reference to FIGS. 3*g* and 3*h*, the retainer leg 124 and the two catches ×14 generally define a C-shaped profile when viewed from above. That is, the catches ×14 are generally perpendicular to the retainer leg 124.

The push-on fastener assembly 102 further comprises one or more spacers to maintain a desired gap distance between the first and second retainers 102*a*, 102*b*, and/or between the push-on fastener assembly 102 and component upon which it secures (e.g., illustrated herein as the first component 104). The one or more spacers are configured to prevent nesting and sticking during, for example, a plating operation. The one or more spacers can be provided in one or more forms, including spring tabs 302 and standoffs 304. For example, the first retainer 102*a* is illustrated with a plurality of spring tabs 302, while the second retainer 102*b* is illustrated with a plurality of standoffs 304. The spring tabs 302 can be punched from the first retainer 102*a* and shaped (or bent) to define arms that provide a downward spring force (e.g., against the second retainer 102*b*). Similarly, the standoffs 304 can be punched from the second retainer 102*b* and shaped to form dimples (e.g., between the second retainer 102*b* and the first component 104).

The push-on fastener assembly 102 can likewise be disassembled to remove the push-on fastener assembly 102 from the post 112 without causing damage to the post 112 (and enabling reuse of the push-on fastener assembly 102). To disassemble the push-on fastener assembly 102, the retainer legs 124 can be pushed or biased inwardly (toward the retainer opening 108) as indicated by arrows 308*a*, 308*b*. For example, the two retainer legs 124*a* can be pinched together such that the one or more engagement features 126 of the second retainer 102*b* disengage the clip(s) 306 of first retainer 102*a* to thereby release the first retainer 102*a*. Once the first retainer 102*a* and second retainer 102*b* are disconnected, the push-on fastener assembly 102 can be slid off the post 112 without harming to the post 112.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A push-on fastener assembly to couple a first component to a second component via a post associated with the second component, the push-on fastener assembly comprising:

a first retainer having a first annular body with a first topside surface and a first underside surface, wherein the first annular body defines a first opening and a first plurality of retainer fingers coupled to the first annular body about the first opening and canted away from the first topside surface at a first angle; and a second retainer having a second annular body with a second topside surface and a second underside surface, wherein the second annular body defines a second opening, a second plurality of retainer fingers coupled to the second annular body about the second opening opposite the retainer fingers of the first opening and canted away from the second topside surface at a second angle, and one or more retainer legs configured to secure the first retainer relative to the second retainer.

2. The push-on fastener assembly of claim 1, wherein at least one of the one or more retainer legs comprises an engagement feature configured to engage the first retainer.

3. The push-on fastener assembly of claim 2, wherein the engagement feature is configured to engage the first retainer via a notch formed in the first retainer.

4. The push-on fastener assembly of claim 3, wherein the engagement feature is a clip.

5. The push-on fastener assembly of claim 2, wherein the engagement feature is configured to engage the first retainer via a clip formed in or on the first retainer.

6. The push-on fastener assembly of claim 5, wherein the engagement feature is a catch.

7. The push-on fastener assembly of claim 1, wherein the first retainer comprises a plurality of spacers configured to maintain a gap between the first underside surface and the second topside surface.

8. The push-on fastener assembly of claim 1, wherein the second retainer comprises a plurality of spacers configured to maintain a gap between the second underside surface and the first component.

9. The push-on fastener assembly of claim 1, wherein each of the first plurality of retainer fingers and the second plurality of retainer fingers comprises a resilient leg with a head that defines a distal edge configured to engage the post.

10. The push-on fastener assembly of claim 1, wherein each of the first opening and the second opening are clipped circular openings.

11. The push-on fastener assembly of claim 1, wherein the first opening and the second opening align to define a retainer opening when the first retainer is secured to the second retainer.

12. The push-on fastener assembly of claim 1, wherein the first angle and the second angle are each between 15 and 45 degrees.

13. The push-on fastener assembly of claim 1, wherein each of the first retainer and the second retainer are a stamped-metal component.

14. The push-on fastener assembly of claim 1, wherein the one or more retainer legs are configured to release the first retainer from the second retainer when biased.

15. A push-on fastener assembly to couple a first component to a second component via a post associated with the second component, the push-on fastener assembly comprising:

a first stamped-metal retainer having a first annular body with a first topside surface and a first underside surface, wherein the first annular body defines a first opening and a first plurality of retainer fingers coupled to the first annular body and canted away from the first topside surface towards a center of the first opening at a first angle; and a second stamped-metal retainer having a second annular body with a second topside surface and a second underside surface, wherein the second annular body defines a second opening, a second plurality of retainer fingers coupled to the second annular body and canted away from the second topside surface towards a center of the second opening at a second angle, and one or more retainer legs configured to secure the first stamped-metal retainer relative to the second stamped-metal retainer, wherein the first opening and the second opening align to define a retainer opening when the first stamped-metal retainer is secured to the second stamped-metal retainer, and wherein at least one of the one or more retainer legs comprises an engagement feature configured to engage the first stamped-metal retainer.

16. The push-on fastener assembly of claim 15, wherein the engagement feature is configured to engage the first stamped-metal retainer via a notch formed in the first stamped-metal retainer.

17. The push-on fastener assembly of claim 15, wherein the engagement feature is configured to engage the first stamped-metal retainer via a clip formed in or on the first stamped-metal retainer.

18. The push-on fastener assembly of claim 15, wherein the first stamped-metal retainer comprises a plurality of spacers configured to maintain a gap between the first underside surface and the second topside surface or between the second underside surface and the first component.

19. A push-on fastener assembly to couple a first component to a second component via a post associated with the second component, the push-on fastener assembly comprising:

a first stamped-metal retainer having a first annular body with a first topside surface and a first underside surface, wherein the first annular body defines a first opening and a first plurality of retainer fingers coupled to the first annular body and canted away from the first topside surface at a first angle; and a second stamped-metal retainer having a second annular body with a second topside surface and a second underside surface, wherein the second annular body defines a second opening, a second plurality of retainer fingers coupled to the second annular body and canted away from the second topside surface at a second angle, and one or more retainer legs configured to secure the first stamped-metal retainer relative to the second stamped-metal retainer, wherein the first opening and the second opening align to define a retainer opening when the first stamped-metal retainer is secured to the second stamped-metal retainer, and wherein at least one of the one or more retainer legs comprises an engagement feature configured to engage the first stamped-metal retainer to secure the first stamped-metal retainer directly to the second stamped-metal retainer and configured to release the first stamped-metal retainer from the second stamped-metal retainer when biased.

20. The push-on fastener assembly of claim 19, wherein the first stamped-metal retainer comprises a plurality of spacers configured to maintain a gap between the first underside surface and the second topside surface or between the second underside surface and the first component.

* * * * *